United States Patent
Nakane et al.

(12) 
(10) Patent No.: US 6,315,350 B1
(45) Date of Patent: Nov. 13, 2001

(54) IMPACT ENERGY ABSORBING STRUCTURE IN UPPER PORTION OF MOTOR VEHICLE BODY

(75) Inventors: Yuji Nakane, Toyota; Toshikatsu Satou, Aichi-Ken, both of (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/481,449

(22) Filed: Jan. 13, 2000

(30) Foreign Application Priority Data

Jan. 14, 1999 (JP) .................................................. 11-0077367

(51) Int. Cl.[7] .............................. B60R 13/02; B60R 21/04
(52) U.S. Cl. ..................... 296/189; 296/39.1; 280/751; 280/752
(58) Field of Search .................................. 296/189, 39.1; 280/751, 752

(56) References Cited

U.S. PATENT DOCUMENTS

| | | |
|---|---|---|
| 5,609,385 | 3/1997 | Daniel et al. . |
| 5,660,426 | 8/1997 | Sugimori et al. . |
| 5,709,407 | 1/1998 | Stephens et al. . |
| 5,720,510 | 2/1998 | Daniel et al. . |
| 5,762,392 | 6/1998 | Suga . |
| 5,795,013 | 8/1998 | Keller et al. . |
| 5,826,907 * | 10/1998 | Saito et al. ............................ 280/808 |
| 5,836,641 | 11/1998 | Sugamoto et al. . |
| 5,868,458 | 2/1999 | Hirata et al. . |
| 5,938,273 | 8/1999 | Williams et al. . |
| 5,992,924 * | 11/1999 | Noritake et al. ...................... 296/189 |
| 6,012,764 * | 2/2000 | Seksaria et al. ...................... 296/189 |
| 6,036,227 * | 3/2000 | Lin et al. .............................. 280/751 |
| 6,050,631 * | 4/2000 | Suzuki et al. ........................ 296/189 |
| 6,059,342 * | 5/2000 | Kawai et al. ....................... 296/39.1 |
| 6,126,231 * | 10/2000 | Suzuki et al. ........................ 296/189 |

FOREIGN PATENT DOCUMENTS

| | | |
|---|---|---|
| 9-277888 | 10/1997 | (JP) . |
| 9-328047 | 12/1997 | (JP) . |
| 10-35378 | 2/1998 | (JP) . |
| 10-86771 | 4/1998 | (JP) . |

* cited by examiner

Primary Examiner—Stephen T. Gordon
Assistant Examiner—Greg Blankenship
(74) Attorney, Agent, or Firm—Oliff & Berridge, PLC

(57) ABSTRACT

In a structure for absorbing energy in an upper portion of a motor vehicle body, an energy absorbing body is disposed between a roof side rail and a roof lining. The energy absorbing body is a resin-made rib member having three longitudinal ribs and transverse ribs that are more in number than the longitudinal ribs. The three longitudinal ribs are formed so as to compensate for a reduced amount of displacement that is allowed for a longitudinal rib for a purpose of energy absorption in a section of the energy absorbing body taken on an imaginary plane extending along at least one of the transverse ribs, by varying at least one of a pitch between two longitudinal ribs provided adjacent to each other in the section, an angle formed by each longitudinal rib with respect to an imaginary horizontal plane in the section, and a thickness of each longitudinal rib.

15 Claims, 7 Drawing Sheets

IMPACT ENERGY ABSORBING STRUCTURE IN UPPER PORTION OF MOTOR VEHICLE BODY

INCORPORATION BY REFERENCE

The disclosure of Japanese Patent Application No. HEI 11-7367 filed on Jan. 14, 1999 including the specification, drawings and abstract is incorporated herein by reference in its entirety.

BACKGROUND OF THE INVENTION

1. Field of the Invention

The present invention relates to an impact energy absorbing structure in an upper portion of a motor vehicle body and, more particularly, to a structure for absorbing an impact energy in an upper portion of a body of a passenger car.

2. Description of the Related Art

U.S. Pat. No. 5,762,392, as for example, proposes an impact energy absorbing structure wherein an energy absorbing interval (space) is formed between an inner panel of a structural member of a vehicle body and an interior member that covers a compartment side of the inner panel and wherein a grating-like energy absorbing body having one or more longitudinal ribs and transverse ribs that are more in number than the longitudinal rib or ribs is disposed within the energy absorbing interval.

In a case where the aforementioned structural member is a roof side rail, the interval space between the roof side rail and a roof lining, that is, an interior member disposed inwardly of the roof side rail, is formed so that the interval distance therebetween gradually decreases from an upper portion of the interval space toward a lower portion thereof (outward in the directions of a vehicle body width), based on a need to ensure easy entrance into the compartment and easy exit therefrom and a need to secure a sufficient clearance between the roof lining and the head of an occupant (head clearance) As a result, the amount of displacement of the energy absorbing body allowed near a lower end of the roof side rail becomes small, so that the amount of energy absorbed by the energy absorbing body becomes less when an impact load occurs near the lower end of the roof side rail than when an equal impact load occurs on an upper portion of the roof side rail. Therefore, in order to ensure that a sufficient amount of energy will be absorbed, it is necessary to increase the interval between the roof side rail and the roof lining. However, this gives rise to problems of a reduction of the ease of entrance and exit and a reduction of the head clearance.

Furthermore, in the case of a front pillar, as for example, the interval distance between the front pillar and a pillar garnish is shorter in a portion near a flange joint portion between an inner panel and an outer panel of the front pillar than in a portion remote from the flange joint portion. Due to circumstances similar to those mentioned above, problems of a reduction of the ease of entrance and exit and a reduction of the visibility arise.

SUMMARY OF THE INVENTION

Accordingly, it is an object of the invention to provide an impact energy absorbing structure in an upper portion of a motor vehicle body which structure compensates for a reduced amount of energy absorbable by the structure resulting from variation in the interval distance between a structural member, such as a roof side rail, a front pillar, other pillars or the like, and an interior member disposed at a compartment side of the structural member.

In accordance with one aspect of the invention, an impact energy absorbing structure in an upper portion of a motor vehicle body includes a roof side rail extending in a front-rear direction with respect to the motor vehicle body, a roof lining disposed at a compartment side of the roof side rail and spaced from the roof side rail by an interval, and a resin-made energy absorbing body disposed in the interval. The energy absorbing body has at least three longitudinal ribs that extend substantially in the front-rear direction and transverse ribs that are more in number than the at least three longitudinal ribs and that extend substantially in a such direction as to intersect with the longitudinal ribs. The at least three longitudinal ribs are formed so as to compensate for a reduced amount of displacement that is allowed for a longitudinal rib for a purpose of energy absorption in a section of the energy absorbing body taken on an imaginary plane extending along at least one of the transverse ribs, by varying at least one of a pitch between two longitudinal ribs provided adjacent to each other in the section, an angle formed by each longitudinal rib with respect to an imaginary horizontal plane in the section, and a thickness of each longitudinal rib.

Since the at least three longitudinal ribs of the energy absorbing body are formed so as to compensate for a reduced amount of displacement that is allowed for a longitudinal rib, the peak value of reaction load produced by a portion of the energy absorbing body where a relatively small amount of displacement is allowed to occur at the time of application of an impact load is increased, so that the small-displacement portion is able to absorb a predetermined amount of impact energy. In a portion of the energy absorbing body where a relatively large amount of displacement is allowed to occur, the peak value of reaction load produced by the portion is kept at a low level, so that the large-displacement portion is also able to absorb the predetermined amount of impact energy.

This impact energy absorbing structure of the invention is intended to change the load-displacement energy absorbing characteristic of the energy absorbing body in order to secure a predetermined energy absorbing ability at any site in the energy absorbing body by varying at least one of the pitch between two adjacent longitudinal ribs, the angle formed by each longitudinal rib with respect to an imaginary horizontal plane, and the thickness of each longitudinal rib. The invention does not complicate the construction of the energy absorbing body.

In accordance with another aspect of the invention, an impact energy absorbing structure in an upper portion of a motor vehicle body includes a roof side rail extending in a front-rear direction with respect to the motor vehicle body, a roof lining disposed at a compartment side of the roof side rail and spaced from the roof side rail by an interval, and a resin-made energy absorbing body disposed in the interval. The energy absorbing body has at least three longitudinal ribs that extend substantially in the front-rear direction and transverse ribs that are more in number than the at least three longitudinal ribs and that extend substantially in such a direction as to intersect with the longitudinal ribs. The at least three longitudinal ribs are arranged so that a pitch between two longitudinal ribs provided adjacent to each other in a section of the energy absorbing body taken on an imaginary plane extending along at least one of the transverse ribs is smaller if an amount of displacement that is allowed for the two longitudinal ribs for a purpose of energy absorption in the section is smaller.

If the number of longitudinal ribs provided is, for example, three, the pitches between the longitudinal ribs are set so that the pitch between the longitudinal rib provided at the uppermost position in the aforementioned section and the longitudinal rib provided at the intermediate position is larger than the pitch between the longitudinal rib provided at the intermediate position and the longitudinal rib provided at the lowermost position. In this case, taking the magnitude of impact load into account, the pitches may be set so that when an impact load acts toward the uppermost longitudinal rib, the uppermost longitudinal rib first deforms and, immediately before substantially complete crush of the uppermost longitudinal rib, the intermediate longitudinal rib starts to deform, and so that when an impact load acts toward the intermediate longitudinal rib, the intermediate longitudinal rib first deforms and, at the time of a certain progress of the deformation of the intermediate longitudinal rib, the lowermost longitudinal rib starts to deform.

Therefore, when an impact load acts toward the longitudinal rib provided at the uppermost position, the uppermost longitudinal rib is deformed by a certain displacement of the impacting body and, immediately before the uppermost longitudinal rib is crushed, the intermediate longitudinal rib starts to deform. In this manner, the peak value of reaction load is kept at a substantially constant level. When an impact load acts toward the intermediate longitudinal rib, the intermediate longitudinal rib deforms and, at the time of a certain deformation of the intermediate longitudinal rib caused by a displacement of the impacting body that is less than the aforementioned predetermined displacement, the lowermost longitudinal rib starts to deform. Therefore, the rising of load becomes sharp, and the peak value of reaction load becomes higher than the peak value mentioned above in connection with the impact load acting toward the uppermost longitudinal rib. The relatively high peak value is substantially maintained until the two longitudinal ribs become crushed. In this manner, a predetermined amount of energy can be absorbed despite a reduced amount of displacement.

If the number of longitudinal ribs provided is three, the angle formed by a longitudinal rib provided at an intermediate position in the section with respect to the imaginary horizontal plane and the angle formed by a longitudinal rib provided at a lowermost position in the section with respect to the imaginary horizontal plane may be greater than the angle formed by a longitudinal rib provided at an uppermost position in the section with respect to the imaginary horizontal plane.

When an impacting body applies an impact load toward the roof side rail, the direction of the impact load is within a predetermined range of angle from the imaginary horizontal plane. To meet safety standards, there is a tendency that when an impact load acts at a greatest angle, the impact load will act on the intermediate and lowermost longitudinal ribs. In this invention, the angle between the intermediate longitudinal rib and the lowermost longitudinal rib is set to a relatively large angle that is closer to the aforementioned range of angle. As a result, the intermediate longitudinal rib and the lowermost longitudinal rib are directed in directions that are substantially the same as the direction of the impact load. Therefore, a load-displacement energy absorbing characteristic with a sharp slope can be achieved, and impact energy can be efficiently absorbed.

The roof side rail may be formed by joining two flanges of an inner panel and two flanges of an outer panel. In this case, the longitudinal rib provided at a lowermost position in the section may be disposed so that the longitudinal rib is allowed to contact a base portion of one of the flanges of the inner panel.

When an impact load occurs, the lowermost longitudinal rib contacts the base portion of the flange so as to prevent the energy absorbing body from sliding upward relative to the inner panel. As a result, the entire energy absorbing body sufficiently deforms to perform reliable energy absorption.

In accordance with still another aspect of the invention, an impact energy absorbing structure in an upper portion of a motor vehicle body includes a pillar extending in an up-down direction with respect to the motor vehicle body and formed by joining two flanges of an inner panel and two flanges of an outer panel, a pillar garnish disposed at a compartment side of the pillar and spaced from the pillar by an interval, and a resin-made energy absorbing body disposed in the interval. The energy absorbing body has at least one longitudinal rib that extends substantially in the up-down direction and transverse ribs that are more in number than the at least one longitudinal rib and that extend substantially in such a direction as to intersect with the longitudinal rib. The transverse ribs are arranged so that a pitch between adjacent transverse ribs provided near a flange joint portion of the pillar is smaller than a pitch between adjacent transverse ribs provided remote from the flange joint portion.

In the case of a pillar, it normally is transverse ribs that mainly contribute to impact load absorption, as described below. Therefore, by setting inter-transverse rib pitches so that the pitch between transverse ribs provided near one of the flange joint portions is smaller than the pitch between transverse ribs provided remote from the flange joint portion, it becomes possible to compensate for a reduction in the amount of energy absorbed by a portion around the flange joint portion that is caused due to a reduced interval between the inner panel of the pillar and the pillar garnish.

BRIEF DESCRIPTION OF THE DRAWINGS

The foregoing and further objects, features and advantages of the present invention will become apparent from the following description of preferred embodiments with reference to the accompanying drawings, wherein like numerals are used to represent like elements and wherein.

DETAILED DESCRIPTION OF PREFERRED EMBODIMENTS

Preferred embodiments of the impact energy absorbing structure of the invention will be described hereinafter with reference to the accompanying drawings.

Figure 1:
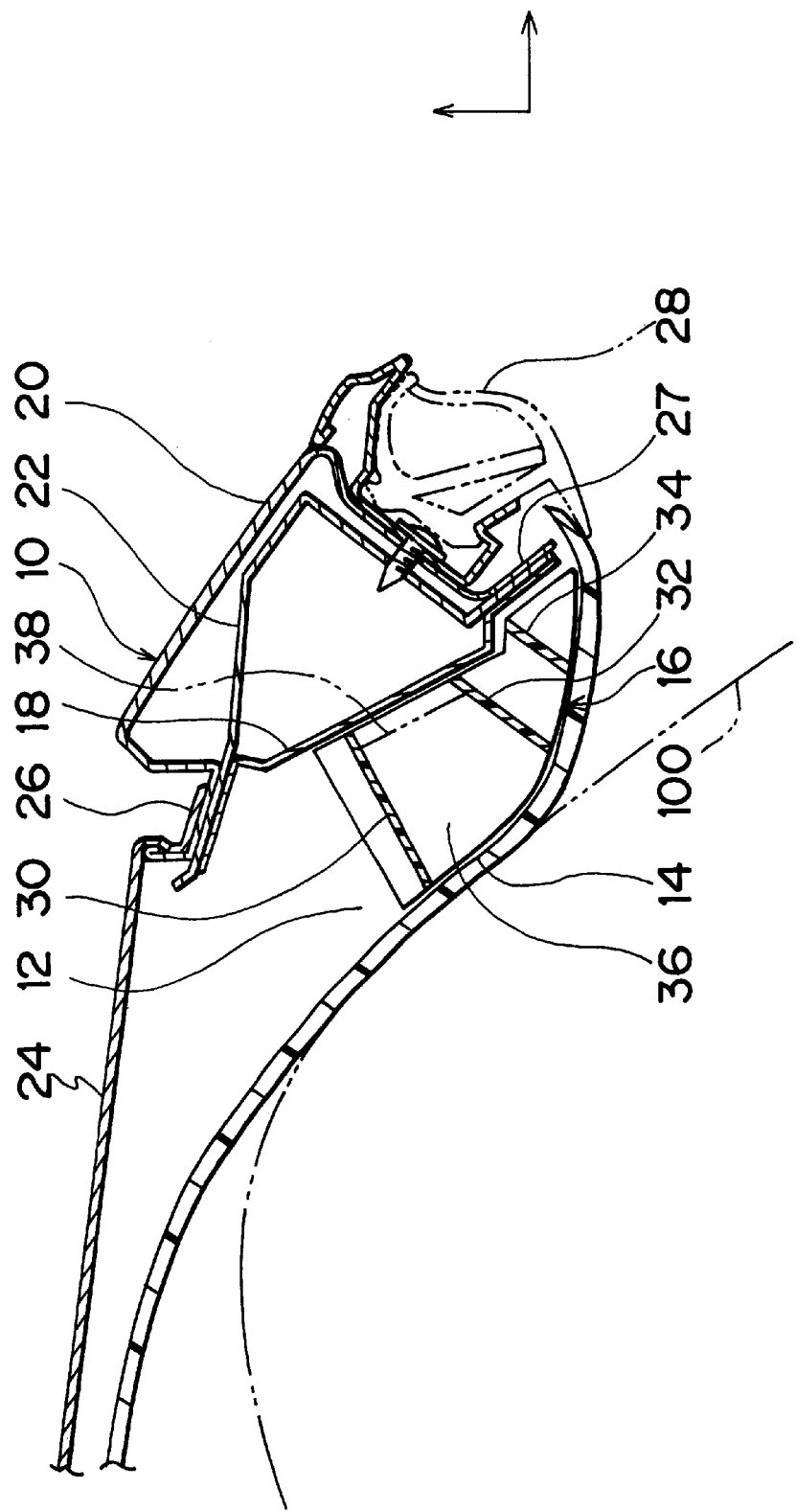
FIG. 1 is a sectional view of a first embodiment of the impact energy absorbing structure in an upper portion of a motor vehicle body according to the invention, taken on an imaginary plane perpendicular to a center line extending in front-rear directions with respect to the vehicle body.
Figure 2:
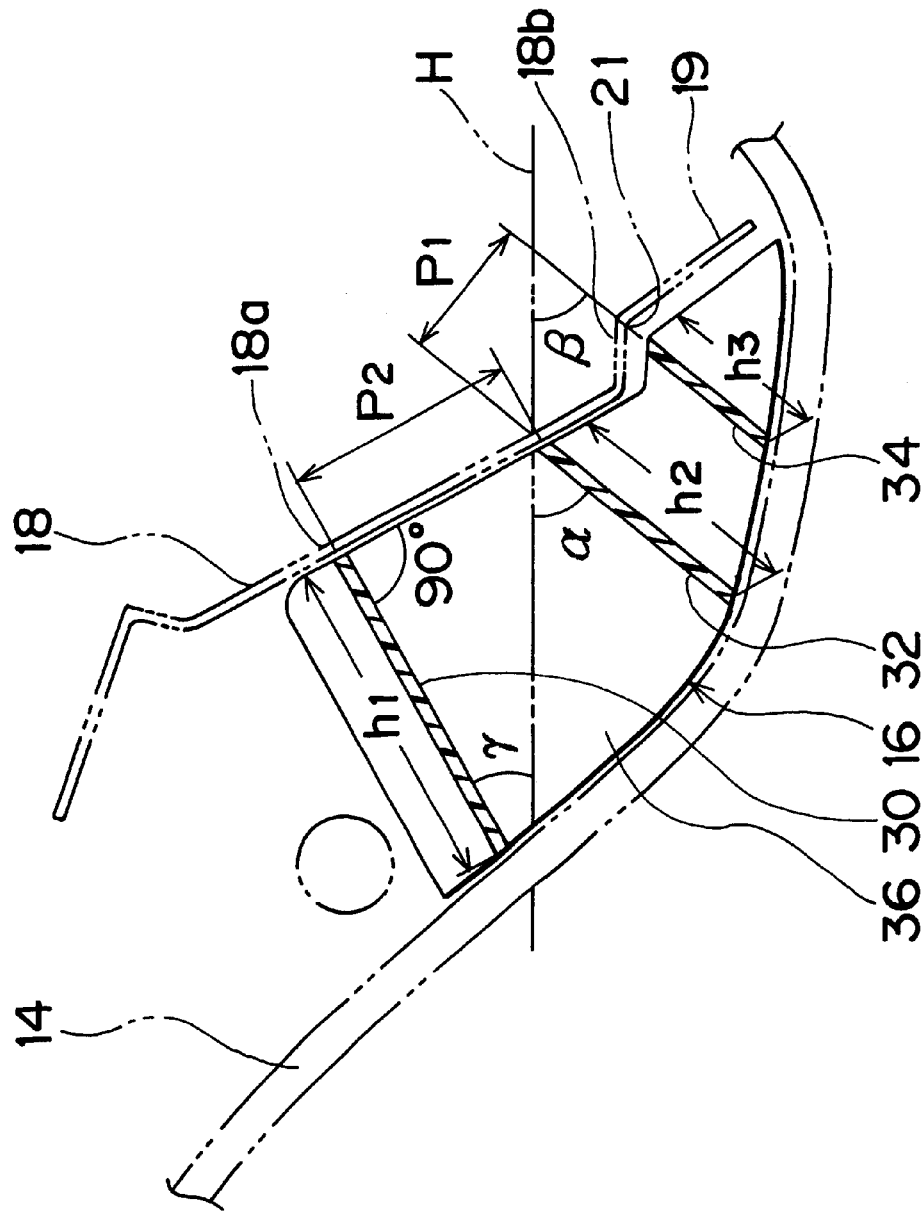
FIG. 2 is an enlarged view of an energy absorbing body shown in FIG. 1.

Referring to the sectional views of FIGS. 1 and 2, a structure for absorbing impact energy according to a first embodiment includes a roof side rail 10 extending in front-rear directions with respect to a motor vehicle body, that is, directions perpendicular to the sheet of each drawing, a roof lining 14 disposed at a compartment side of the roof side rail 10 and spaced therefrom by an interval 12, and an energy absorbing body 16 disposed within the interval 12. Thus, the impact energy absorbing structure absorbs impact energy in an upper portion of the motor vehicle body.

In the first embodiment, the roof side rail 10 includes an inner panel 18, an outer panel 20, and a reinforcing panel 22. These panels are joined together to form a structure having a closed section by superimposing and spot-welding flanges of the individual panels. A roof panel 24 is joined to a flange joint portion 26 of the roof side rail 10 extending along an inner side of the roof side rail 10, the inner side being located inward in the directions of width of the vehicle body. A weather strip 28 is attached near a flange joint portion 27 provided on an outer side of the roof side rail 10 located outward in the directions of width of the vehicle body.

The interval 12 defined between the roof lining 14 and the inner panel 18 gradually reduces from an upper portion toward a lower portion of the interval 12 in the sectional view of FIG. 1, that is, from an inner portion toward an outer portion thereof with respect to the directions of width of the vehicle body.

The energy absorbing body 16 is a resin-made rib member having three longitudinal ribs 30, 32, 34 extending in the front-rear directions with respect to the vehicle body and transverse ribs 36 that are more in number than the longitudinal ribs and that extend in such directions as to intersect with the longitudinal ribs. Although in the first embodiment, the number of longitudinal ribs is three, the number of longitudinal ribs may also be greater than three. The transverse ribs 36 are arranged equidistantly in the front-rear directions. The energy absorbing body 16 is formed from a hard resin separately from the roof lining 14. The energy absorbing body 16 is attached to the inner panel 18 by using clips (not shown) that extend through suitably provided mounting seats 38. The energy absorbing body 16 may also be attached to the roof lining 14 by providing the mounting seats 38 on the roof lining 14.

The at least three longitudinal ribs 30, 32, 34 are formed so as to compensate for a reduced amount of displacement that is allowed for the longitudinal ribs 32, 34 for the purpose of energy absorption in a section of the energy absorbing body 16 that would be formed by cutting the energy absorbing body 16 on an imaginary plane extending along at least one of the transverse ribs 36, for example, an imaginary plane perpendicular to a center line extending in the front-rear directions, by varying at least one of a pitch between two adjacent longitudinal ribs 30, 32 provided in the aforementioned section, or a pitch between the two adjacent longitudinal ribs 32, 34, an angle of each longitudinal rib 30, 32, 34 with respect to an imaginary horizontal plane in that section, a thickness of each longitudinal rib 30, 32, 34.

Since the interval 12 gradually reduces from an upper portion toward a lower portion of the space of the interval 12 (from an inner portion toward an outer portion with respect to the directions of width of the vehicle body) in the aforementioned section as described above, a height $h_2$ of the intermediate longitudinal rib 32 and a height $h_3$ of the lower longitudinal rib 34 are less than a height $h_1$ of the upper longitudinal rib 30, so that the amounts of displacement for energy absorption allowed for the intermediate and lower longitudinal ribs 32, 34 are less than that allowed for the upper longitudinal rib 30. That is, the amount of energy absorbable at the upper longitudinal rib 30 is relatively large, and the amounts of energy absorbable at the intermediate and lower longitudinal ribs 32, 34 are relatively small. Therefore, it is necessary to compensate for such reductions (variations) in the amount of absorbable energy.

Figure 10:
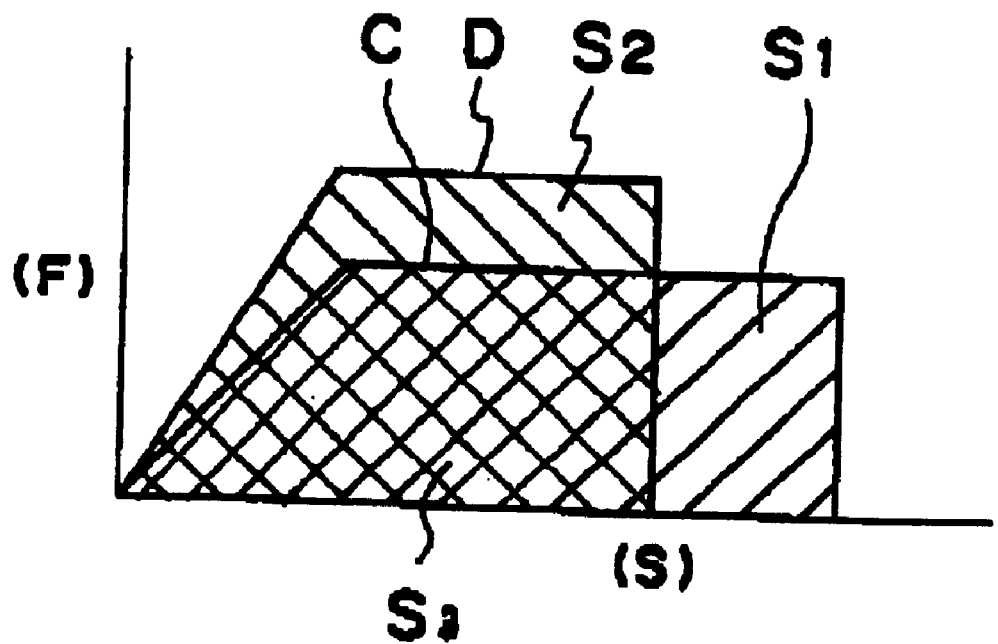
FIG. 10 is a load-displacement energy absorbing characteristic graph.

As is apparent from FIG. 10, the energy absorbing characteristic curve D rises more sharply and reaches a higher peak load but involves less displacement than the energy absorbing characteristic curve C. The areas S1, S2 defined below the energy absorbing characteristic curves C, D in FIG. 10 indicate the amounts of energy absorbed. Therefore, if the angle and/or thickness of the longitudinal ribs 32, 34 is set so that the area S1 and the area S2 become equal, it becomes possible to absorb a substantially constant amount of energy regardless of the direction of impact load applied from an impacting body.

As can be seen in FIG. 2, an angle α formed by the intermediate longitudinal rib 32 of the three longitudinal ribs 30, 32, 34, which is located at an intermediate position in the aforementioned section, with respect to an imaginary horizontal plane H, and an angle β formed by the lowermost longitudinal rib 34 with respect to the imaginary horizontal plane H are greater than an angle γ formed by the uppermost longitudinal rib 30 with respect to the imaginary horizontal plane H. In the FIG. 2 embodiment, the angle α and the angle β are both 50°, and the angle γ is 35°.

As indicated in FIG. 2, the inter-longitudinal rib pitches $P_1$, $P_2$ are varied, and the angles α, β, γ of the longitudinal ribs 30, 32, 34 with respect to the imaginary horizontal plane H are also varied. In addition to or instead of such variations, it is also possible to set a thickness of each of the longitudinal ribs 32, 34 greater than a thickness of the longitudinal rib 30. In short, what is needed to compensate for a reduction in the amount of absorbable energy caused at the longitudinal ribs 32, 34 by reductions in the amount of displacement thereat is to vary at least one of the following factors, that is, the inter-longitudinal rib pitches $P_1$, $P_2$, the angles α, β, γ of the longitudinal ribs 30, 32, 34, and the thicknesses of the longitudinal ribs 30, 32, 34.

As shown in FIG. 2, the longitudinal rib 34, that is, the lowermost longitudinal rib in the aforementioned section, is disposed so that the longitudinal rib 34 can contact a base portion 21 of a flange 19 of the inner panel 18. Typically, the inner panel 18 has a general surface portion 18a, a longitudinal wall surface portion 18b bent from the general surface portion 18a and extending horizontally, and the flange 19 extending from the longitudinal wall surface portion 18b diagonally downward toward the outside of the compartment. Therefore, the base portion 21 of the flange 19 is angled in predetermined manner. Hence, the longitudinal rib 34 is preferably directed to the angled base portion 21 so as to prevent the energy absorbing body 16 from sliding relative to the inner panel 18 when receiving an impact load.

A second embodiment of the impact energy absorbing structure of the invention will be described with reference to FIGS. 3 and 4.

Figure 3:
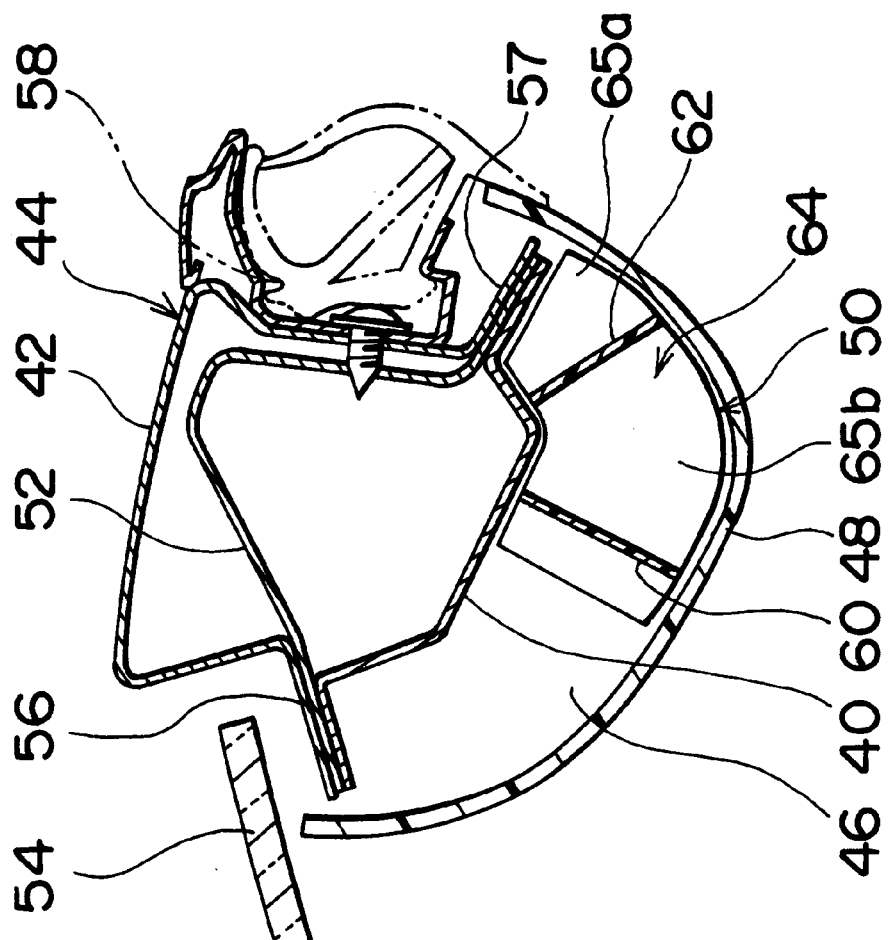
FIG. 3 is a sectional view of a second embodiment of the impact energy absorbing structure in an upper portion of a motor vehicle body according to the invention, taken on an imaginary horizontal plane.
Figure 4:
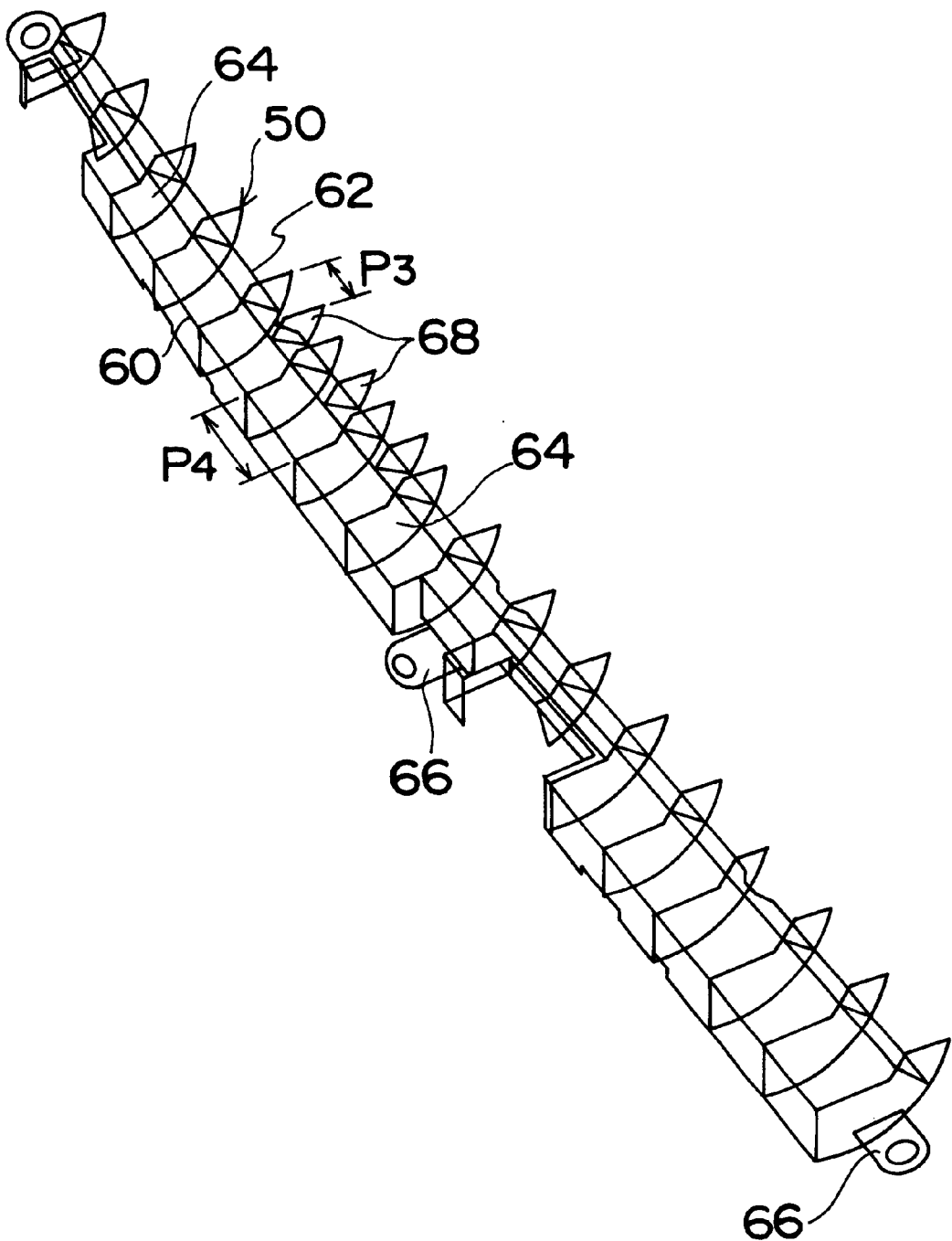
FIG. 4 is a schematic perspective view of an energy absorbing body shown in FIG. 3.

An impact energy absorbing structure shown in the sectional view of FIG. 3 and the perspective view of FIG. 4 includes a font pillar 44 that is formed by an inner panel 40 and an outer panel 42 joined at two flanges of each panel and that extends in up-down directions, a pillar garnish 48 disposed at a compartment side of the font pillar 44 and spaced therefrom by an interval 46, and an energy absorbing body 50 disposed within the interval 46. Thus, the impact energy absorbing structure absorbs impact energy in an upper portion of a motor vehicle body.

In the second embodiment, a reinforcing panel 52 is disposed between the inner panel 40 and the outer panel 42. A windshield 54 is disposed forward of a forward flange joint portion 56 of the font pillar 44. A weather strip 58 is disposed near a rearward flange joint portion 57 of the font pillar 44.

The energy absorbing body 50 is a resin-made rib member having two longitudinal ribs 60, 62 extending in up-down directions and transverse ribs 64 that are more in number than the longitudinal ribs and that extend in such directions as to intersect with the longitudinal ribs. The number of longitudinal ribs provided is at least one. The energy absorbing body 50 is formed from a hard resin separately from the pillar garnish 48. The energy absorbing body 50 is attached to the inner panel 40 by using clips that extend through suitably provided mounting seats 66.

The plural transverse ribs 64 are arranged so that at least the pitch between adjacent transverse ribs disposed near the rearward flange joint portion 57 is smaller than the pitch between adjacent transverse ribs disposed remote from the rearward flange joint portion 57.

As is apparent from FIG. 3, the interval 46 is formed so that the interval distance in portions of the interval space 46 near the flange joint portion 56, 57 is shorter than the interval distance in portions thereof remote from the flange joint portion 56, 57. Therefore, the height of a side portion 65*a* of each transverse rib 64 near the flange joint portion 57 is less than the height of an intermediate portion 65*b* of the transverse rib 64 remote from the flange joint portion 57. Hence, it is necessary to compensate for reductions in the amount of absorbable energy caused at the side portions of 65*a* of the transverse ribs 64 by reductions in the amount of displacement allowed thereat.

In the second embodiment, a plurality of auxiliary transverse ribs 68 are disposed near the rearward flange joint portion 57 to vary the inter-transverse rib pitch. More specifically, the auxiliary transverse ribs 68 are attached to the longitudinal rib 62 so that each auxiliary transverse rib 68 is disposed substantially in the middle between the side portions 65*a* of two adjacent transverse ribs 64. Therefore, the pitch $P_3$ between each auxiliary transverse rib 68 and the side portion 65*a* of an adjacent transverse rib 64 located near the rearward flange joint portion 57 is smaller than the pitch $P_4$ between the intermediate portions 65*b* of adjacent transverse ribs 64 located remote from the rearward flange joint portion 57.

In the case of the font pillar 44, the windshield 54 is disposed near the forward flange joint portion 56, so that a significantly great impact load does not occur near the forward flange joint portion 56. Therefore, the energy absorbing body 50 is disposed in a rearward portion of the interval 46. Accordingly, the inter-transverse rib pitch is reduced only with respect to the side portions 65*a* of the transverse ribs 64 located near the rearward flange joint portion 57. In contrast, in the case of a center pillar, a transverse rib arrangement is provided in which the pitch between side portions of transverse ribs located near two flange portions is smaller than the pitch between intermediate portions of the transverse ribs.

In contrast to the case of the roof side rail 10, where the pitch of the longitudinal ribs 30, 32, 34 is varied, the impact energy absorbing structure for the font pillar 44 deals with reductions in the amount of displacement by varying the pitch of the transverse ribs 64, for the following reasons.

Figure 5:
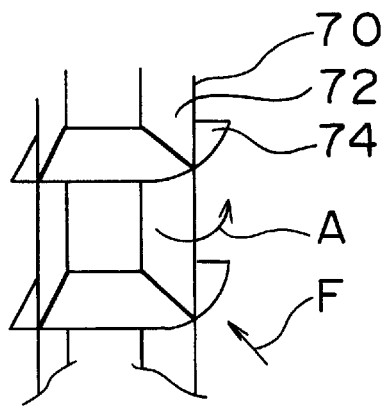
FIG. 5 is a schematic perspective diagram illustrating deformation of the energy absorbing body.

Referring to the schematic illustration of FIG. 5, a longitudinal rib 72 of an energy absorbing body 70 provided for pillar buckles during an initial period of application of an impact load F, and then deforms as indicated by an arrow A. In contrast, transverse ribs 74 of the energy absorbing body 70 initially buckle and then bend.

Figure 6:
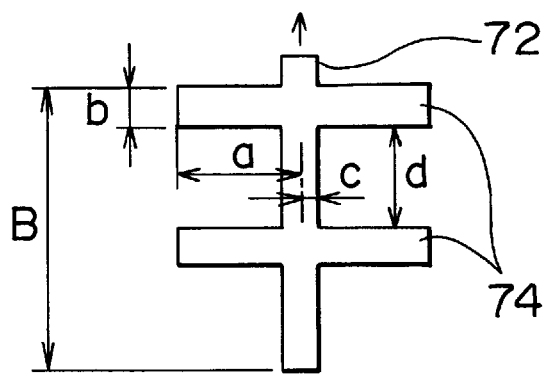
FIG. 6 is a schematic elevated diagram illustrating deformation of the energy absorbing body.

The initial buckling load is proportional to a minimum section secondary moment of resin ribs within a region B of contact with an impacting body, that is, proportional to the minimum section secondary moment about the longitudinal rib 72. If dimensions are set as in FIG. 6, the minimum section secondary moment about a longitudinal rib can be expressed as in:

$$I=(ba^3/3)\times 4+(dc^3/3)\times 4$$

In the equation, the first term pertains to a transverse rib, and the second term pertains to a longitudinal rib. Typically, since $(ba^3/3)>(dc^3/3)$, the effect of transverse ribs is more remarkable than the effect of longitudinal ribs in the case of a pillar.

Figure 7:
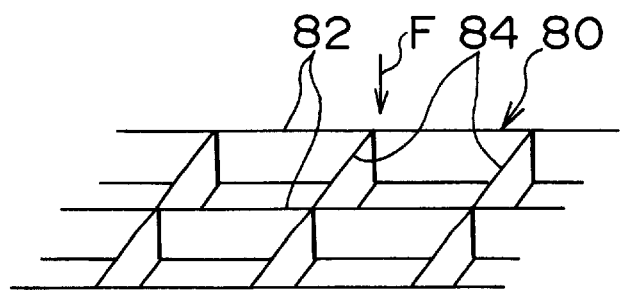
FIG. 7 is a schematic perspective diagram illustrating deformation of the energy absorbing body.

In contrast, in the case of a roof side rail as schematically illustrated in FIG. 7, longitudinal ribs 82 and transverse ribs 84 of an energy absorbing body 80 disposed for the roof side rail form a grating-like resin rib member. When an impact load F occurs on the energy absorbing body 80, longitudinal ribs 82 and transverse ribs 84 deform in substantially the same manner or to substantially equal extent due to the grating-like arrangement, so that the deforming loads thereon are substantially equal. This is because the minimum section secondary moment about a longitudinal rib 82 and the minimum section secondary moment about a transverse rib 84 are substantially equal. Therefore, if a longitudinal rib 82 and a transverse rib 84 are substantially equal as described above, the amounts of energy absorbable at various portions of the energy absorbing body 80 can easily be adjusted and set by making variation in either the longitudinal ribs or the transverse ribs that are less in number. The foregoing discussion is made on a precondition that the grating openings are equal in size, shape or the like. If the grating openings are not equal, the foregoing discussion does not apply.

Figure 8:
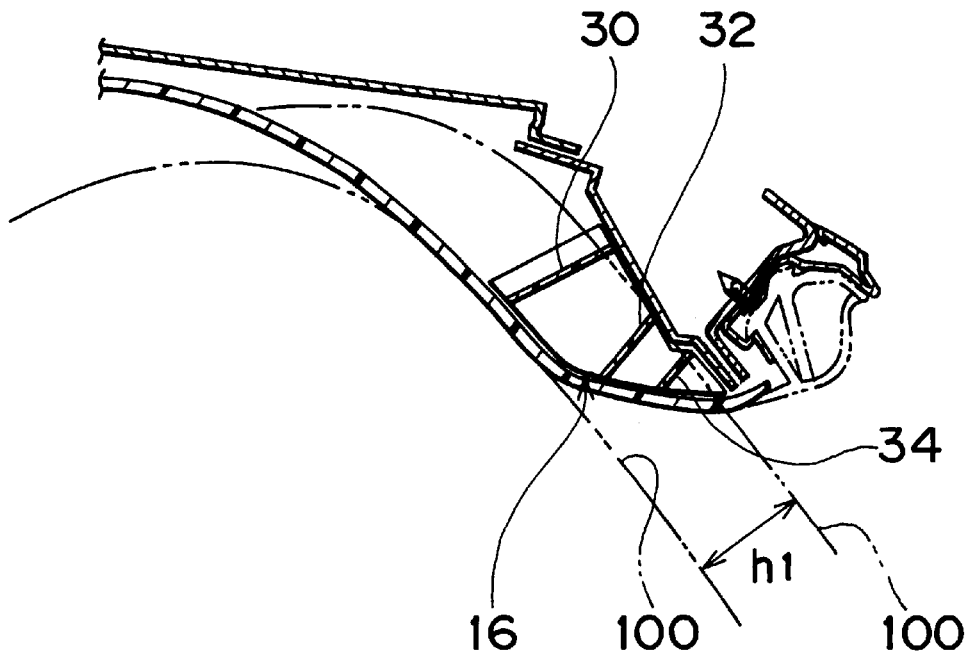
FIG. 8 is a schematic illustration of the operation of the energy absorbing body shown in FIGS. 1 and 2, indicating an impact load being applied at a gentle angle.
Figure 9:
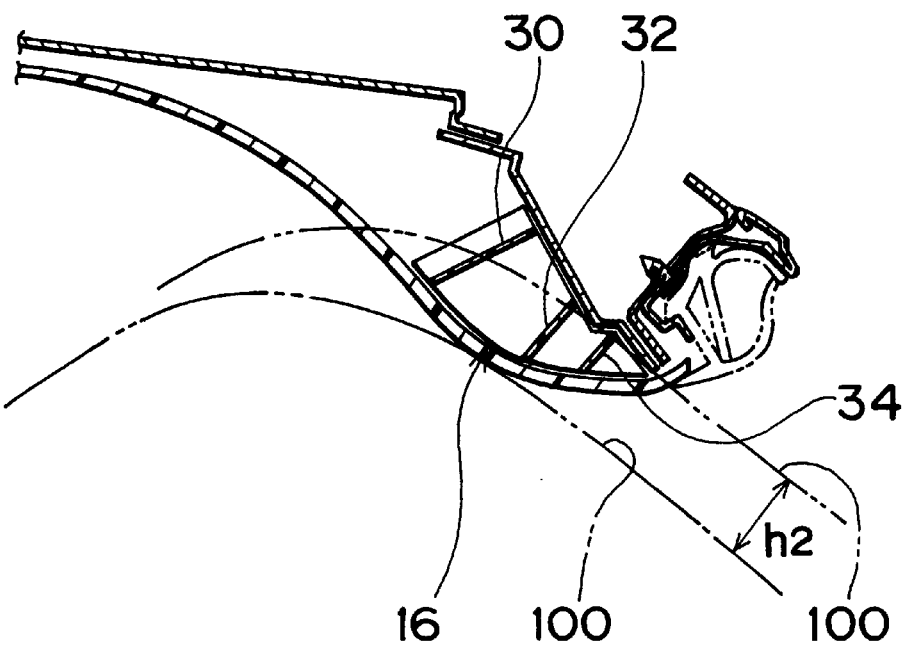
FIG. 9 is schematic illustration of the operation of the energy absorbing body shown in FIGS. 1 and 2, indicating an impact load being applied at a sharp angle.

The operation of the energy absorbing body 16 in the first embodiment shown in FIGS. 1 and 2 will be described with reference to the schematic illustrations of FIGS. 8 and 9.

If an impacting body 100 impacts at a relatively gentle angle within an angle range determined according to a safety standard (FIG. 8), the upper longitudinal rib 30 of the energy absorbing body 16 mainly deforms and produces reaction load. When deformation of the longitudinal rib 30 progresses so that the reaction load starts to decrease, the intermediate longitudinal rib 32 deforms and produces reaction load, so that a constant peak load is maintained as indicated by a line C in the diagram of FIG. 10 indicating an energy absorbing characteristic between the load F and the displacement S. If the impacting body 100 impacts at the sharpest angle (FIG. 9), the intermediate longitudinal rib 32 of the energy absorbing body 16 mainly deforms and produces reaction load. While deformation of the longitudinal rib 32 progresses, the lower longitudinal rib 34 deforms and produces reaction load, so that a constant peak load is subsequently maintained. As a result, an energy absorbing characteristic as indicated by a line D in FIG. 10 is achieved.

As is apparent from FIG. 10, the energy absorbing characteristic curve D rises more sharply and reaches a higher peak load but involves less displacement than the energy absorbing characteristic curve C. The areas S1, S2 defined below the energy absorbing characteristic curves C, D in FIG. 10 indicate the amounts of energy absorbed. The areas S2+S3 defined below the line D of the energy absorbing characteristic indicate the amount of energy absorbed thereby. Therefore, if the angle and/or thickness of the longitudinal ribs 32, 34 is set so that the area S1+S3 and the area S2+S3, that is, the area S1 and the area S2 become equal, it becomes possible to absorb a substantially constant amount of energy regardless of the direction of impact load applied from an impacting body.

While the present invention has been described with reference to what are presently considered to be preferred embodiments thereof, it is to be understood that the present invention is not limited to the disclosed embodiments or constructions. On the contrary, the present invention is intended to cover various modifications and equivalent arrangements.

What is claimed is:

1. An impact energy absorbing structure in an upper portion of a motor vehicle body, comprising:
   a roof side rail extending in a front-rear direction with respect to the motor vehicle body;
   a roof lining disposed at a compartment side of the roof side rail and spaced from the roof side rail by an interval; and
   a resin-made energy absorbing body disposed in the interval and having at least three longitudinal ribs that extend substantially in the front-rear direction and transverse ribs that are more in number than the at least three longitudinal ribs and that extend in a direction that substantially intersects with the longitudinal ribs, at least one of the at least three longitudinal ribs having a length different from others of the at least three longitudinal ribs so as to have a different amount of displacement relative to the others, the at least three longitudinal ribs being formed so as to compensate for the difference in displacement amount due to the length difference for a purpose of energy absorption in a section of the energy absorbing body taken on an imaginary plane extending along at least one of the transverse ribs, by varying at least one of a pitch between two longitudinal ribs provided adjacent to each other in the section, an angle formed by each longitudinal rib with respect to an imaginary horizontal plane in the section, and a thickness of each longitudinal rib.

2. An impact energy absorbing structure according to claim 1, wherein the at least three longitudinal ribs are arranged so that the pitch between two longitudinal ribs provided adjacent to each other in the section of the energy absorbing body taken on the imaginary plane extending along at least one of the transverse ribs is smaller if the amount of displacement by the two longitudinal ribs for the purpose of energy absorption in the section is smaller.

3. An impact energy absorbing structure according to claim 1, wherein the interval decreases along a direction transverse to the at least three longitudinal ribs and the at least three longitudinal ribs are arranged so that the pitch between two longitudinal ribs provided adjacent to each other in the section is smaller if the interval at a position between the two adjacent longitudinal ribs is less than at a position between other adjacent ones of the at least three longitudinal ribs.

4. An impact energy absorbing structure according to claim 1, wherein the angle formed by a longitudinal rib with respect to the imaginary horizontal plane in the section is greater if the longitudinal rib has a shorter length than other ones of the at least three longitudinal ribs.

5. An impact energy absorbing structure according to claim 1, wherein a number of the longitudinal ribs provided is three, and the angle formed by a longitudinal rib provided at an intermediate position in the section with respect to the imaginary horizontal plane and the angle formed by a longitudinal rib provided at a lowermost position in the section with respect to the imaginary horizontal plane are greater than the angle formed by a longitudinal rib provided at an uppermost position in the section with respect to the imaginary horizontal plane.

6. An impact energy absorbing structure according to claim 1, wherein the at least three longitudinal ribs are formed so that the thickness of a longitudinal rib is greater if the longitudinal rib has a reduced length from others of the at least three longitudinal ribs.

7. An impact energy absorbing structure according to claim 1, wherein the roof side rail is formed by joining two flanges of an inner panel and two flanges of an outer panel, and a longitudinal rib provided at a lowermost position in the section is disposed so that the longitudinal rib is allowed to contact a base portion of one of the flanges of the inner panel.

8. An impact energy absorbing structure according to claim 1, wherein an amount of energy that the energy absorbing body is able to absorb when an impact load occurs in a first direction in which a greatest amount of displacement is allowed for the longitudinal ribs within a region where occurrence of an impact load is possible is substantially equal to an amount of energy that the energy absorbing body is able to absorb when an impact load occurs in a second direction in which a least amount of displacement is allowed for the longitudinal ribs.

9. An impact energy absorbing structure in an upper portion of a motor vehicle body, comprising:
   a roof side rail extending in a front-rear direction with respect to the motor vehicle body;
   a roof lining disposed at a compartment side of the roof side rail and spaced from the roof side rail by an interval; and
   a resin-made energy absorbing body disposed in the interval and having at least three longitudinal ribs that extend substantially in the front-rear direction and transverse ribs that are more in number than the at least three longitudinal ribs and that in a direction that substantially intersects with the longitudinal ribs, at least one of the at least three longitudinal ribs having a length different from others of the at least three longitudinal ribs so as to have a different amount of displacement relative to the others, the at least three longitudinal ribs being arranged so that a pitch between two longitudinal ribs provided adjacent to each other in a section of the energy absorbing body taken on an imaginary plane extending along at least one of the transverse ribs is set so that longitudinal ribs having a lesser amount of displacement have a smaller pitch that a pitch between two longitudinal ribs having a greater amount of displacement.

10. An impact energy absorbing structure according to claim 9, wherein the interval decreases along a direction transverse to the at least three longitudinal ribs and the at least three longitudinal ribs are arranged so that the pitch between two longitudinal ribs provided adjacent to each other in the section is smaller if the interval at a position between the two adjacent longitudinal ribs is less than at a position between other adjacent ones of the at least three longitudinal ribs.

11. An impact energy absorbing structure according to claim 9, wherein an angle formed by a longitudinal rib with respect to an imaginary horizontal plane in the section is greater if the longitudinal rib has a shorter length than other ones of the at least three longitudinal ribs.

12. An impact energy absorbing structure according to claim 9, wherein a number of the longitudinal ribs provided is three, and the angle formed by a longitudinal rib provided at an intermediate position in the section with respect to the imaginary horizontal plane and the angle formed by a longitudinal rib provided at a lowermost position in the section with respect to the imaginary horizontal plane are greater than the angle formed by a longitudinal rib provided at an uppermost position in the section with respect to the imaginary horizontal plane.

13. An impact energy absorbing structure according to claim 9, wherein the at least three longitudinal ribs are formed so that the thickness of a longitudinal rib is greater if the longitudinal rib has a reduced length from others of the at least three longitudinal ribs.

14. An impact energy absorbing structure according to claim 9, wherein the roof side rail is formed by joining two flanges of an inner panel and two flanges of an outer panel, and a longitudinal rib provided at a lowermost position in the section is disposed so that the longitudinal rib is allowed to contact a base portion of one of the flanges of the inner panel.

15. An impact energy absorbing structure according to claim 9, wherein an amount of energy that the energy absorbing body is able to absorb when an impact load occurs in a first direction in which a greatest amount of displacement is allowed for the longitudinal ribs within a region where occurrence of an impact load is possible is substantially equal to an amount of energy that the energy absorbing body is able to absorb when an impact load occurs in a second direction in which a least amount of displacement is allowed for the longitudinal ribs.

* * * * *